(12) United States Patent
Kiyota

(10) Patent No.: US 12,276,300 B2
(45) Date of Patent: Apr. 15, 2025

(54) FASTENER

(71) Applicant: PIOLAX, INC., Kanagawa (JP)

(72) Inventor: Hikaru Kiyota, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 477 days.

(21) Appl. No.: 17/639,776

(22) PCT Filed: Sep. 7, 2020

(86) PCT No.: PCT/JP2020/033778
§ 371 (c)(1),
(2) Date: Mar. 2, 2022

(87) PCT Pub. No.: WO2021/049458
PCT Pub. Date: Mar. 18, 2021

(65) Prior Publication Data
US 2022/0333626 A1      Oct. 20, 2022

(30) Foreign Application Priority Data

Sep. 13, 2019  (JP) ................................. 2019-167066

(51) Int. Cl.
*F16B 5/06* (2006.01)
(52) U.S. Cl.
CPC .................... *F16B 5/065* (2013.01)
(58) Field of Classification Search
CPC ...... F16B 5/0621; F16B 5/065; F16B 5/0685; F16B 5/12; F16B 5/121; H01R 13/73; H01R 13/74; H01R 13/741; H01R 13/745
See application file for complete search history.

(56) References Cited

U.S. PATENT DOCUMENTS 3,271,059 A * 9/1966 Pearson .................. F16B 5/065
                                                       24/453
6,805,524 B2 * 10/2004 Kanie ..................... F16B 5/065
                                                       411/174
(Continued)

FOREIGN PATENT DOCUMENTS

GB          933075 A  *  8/1963   .............. F16B 5/065
GB         1347678 A  *  2/1974   ............ F16B 5/0621
(Continued)

OTHER PUBLICATIONS

Oct. 13, 2020, International Search Report issued for related PCT application No. PCT/JP2020/033778.
(Continued)

*Primary Examiner* — Josh Skroupa
(74) *Attorney, Agent, or Firm* — Paratus Law Group, PLLC

(57) ABSTRACT

A fastener for attaching a component having a rail groove to an attachment member includes: a coupling portion that is configured to be coupled to the component; and a fixing portion that supports the coupling portion and that is configured to be fixed to the attachment member. The coupling portion includes an insertion portion to be inserted into the rail groove, and an elastic piece located at a position shifted from the insertion portion in an insertion direction. The elastic piece includes a locking portion that is configured to be locked to the component to restrict the insertion portion from coming out of the rail groove, the elastic piece configured to abut against and urge the component in a bent state.

4 Claims, 5 Drawing Sheets

(56) References Cited

U.S. PATENT DOCUMENTS

| | | | | | |
|---|---|---|---|---|---|
| 7,401,994 | B2* | 7/2008 | Kojima | ................... | F16B 5/121 |
| | | | | | 403/326 |
| 7,669,807 | B2* | 3/2010 | Stigler | .................. | F16B 5/0621 |
| | | | | | 403/397 |
| 8,221,042 | B2* | 7/2012 | Vitali | .................... | F16B 21/086 |
| | | | | | 411/510 |
| 11,585,365 | B2* | 2/2023 | Steltz | ................... | F16B 5/0621 |

FOREIGN PATENT DOCUMENTS

| | | |
|---|---|---|
| JP | H 08-195253 A | 7/1996 |
| JP | H 08-326726 A | 12/1996 |
| JP | 2012-113835 A | 6/2012 |
| WO | WO 2016/084670 A1 | 6/2016 |

OTHER PUBLICATIONS

Oct. 13, 2020, International Search Opinion issued for related PCT application No. PCT/JP2020/033778.

* cited by examiner

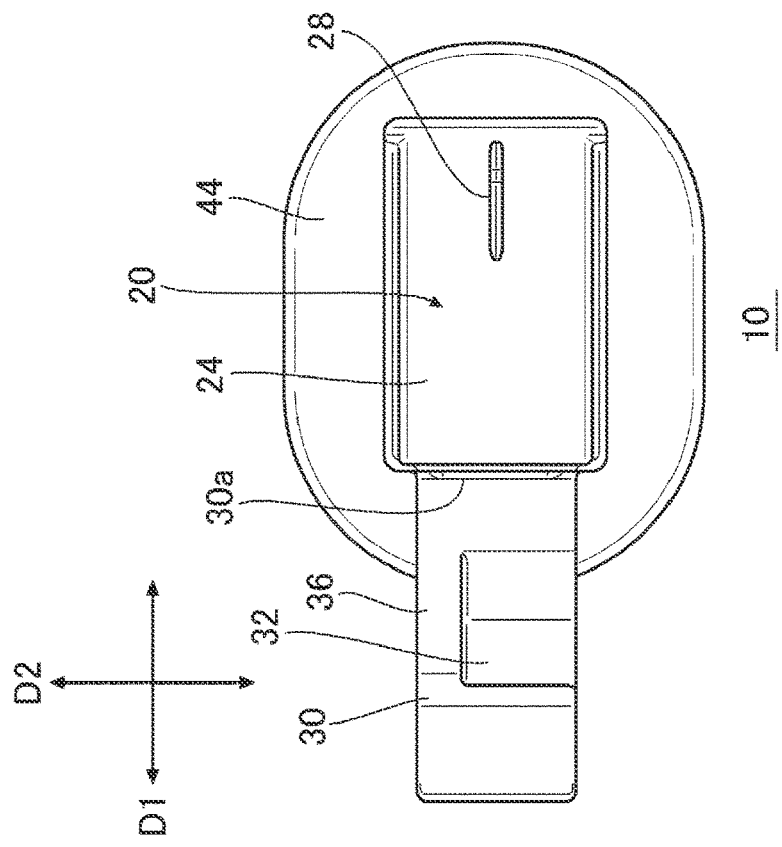
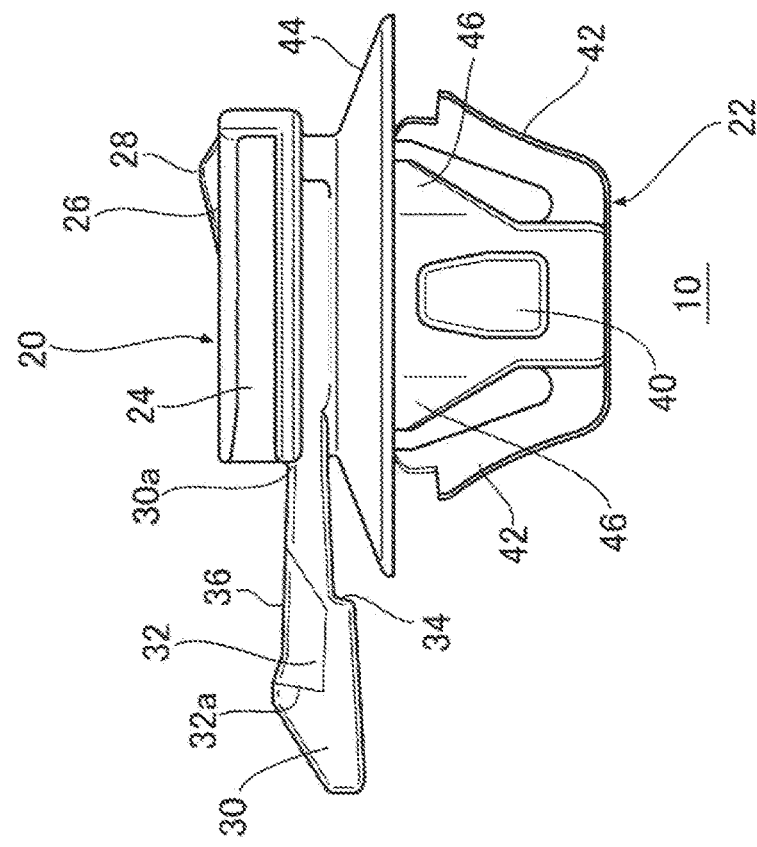
FIG. 2A
FIG. 2B

FASTENER

CROSS REFERENCE TO PRIOR APPLICATION

This application is a National Stage Patent Application of PCT International Patent Application No. PCT/JP2020/033778 (filed on Sep. 7, 2020) under 35 U.S.C. § 371, which claims priority to Japanese Patent Application No. 2019-167066 (filed on Sep. 13, 2019), which are all hereby incorporated by reference in their entirety.

TECHNICAL FIELD

The present invention relates to a fastener for attaching a component to an attachment member.

BACKGROUND ART

Patent Literature 1 discloses a connector attaching clamp including a mounting portion to which a connector is mounted and a locking leg portion that is locked to an attachment hole. The mounting portion includes an insertion portion into which an engagement piece of the connector is insertable, and a locking piece that is locked to a locking claw of the connector.

CITATION LIST

Patent Literature

Patent Literature 1: JP-A-H08-195253

SUMMARY OF INVENTION

Technical Problem

In the connector attaching clamp disclosed in Patent Literature 1, since the insertion portion and the locking piece are arranged side by side in an axial direction, a distance in the axial direction between the connector and the attachment hole is increased, and an attachment state of the connector may rattle.

An object of the present invention is to provide a fastener by which a component is stably attached to an attachment member.

Solution to Problem

In order to solve the above problems, according to an aspect of the present invention, there is provided a fastener for attaching a component having a rail groove to an attachment member, the fastener including: a coupling portion that is configured to be coupled to the component; and a fixing portion that supports the coupling portion and that is configured to be fixed to the attachment member. The coupling portion includes an insertion portion to be inserted into the rail groove, and an elastic piece located at a position shifted from the insertion portion in an insertion direction. The elastic piece includes a locking portion that is configured to be locked to the component to restrict the insertion portion from coming out of the rail groove, the elastic piece configured to abut against and urge the component in a bent state.

Advantageous Effects of Invention

According to the present invention, it is possible to provide the fastener by which the component is stably attached to the attachment member.

BRIEF DESCRIPTION OF DRAWINGS

FIG. 2A is a front view of the fastener, and FIG. 2B is a plan view of the fastener.

DESCRIPTION OF EMBODIMENTS

Figure 1A:
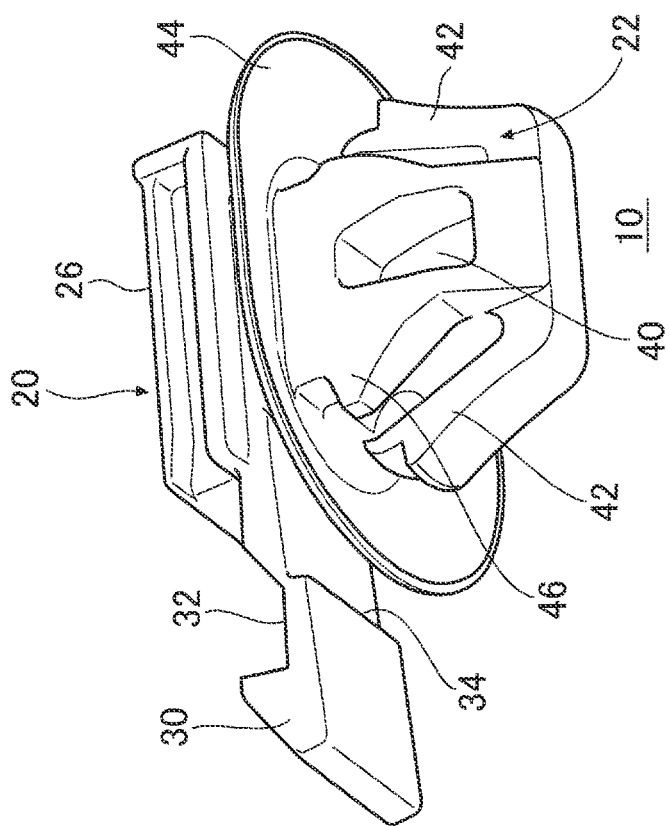
FIGS. 1A and 1B are perspective views of a fastener according to an embodiment.
Figure 1B:
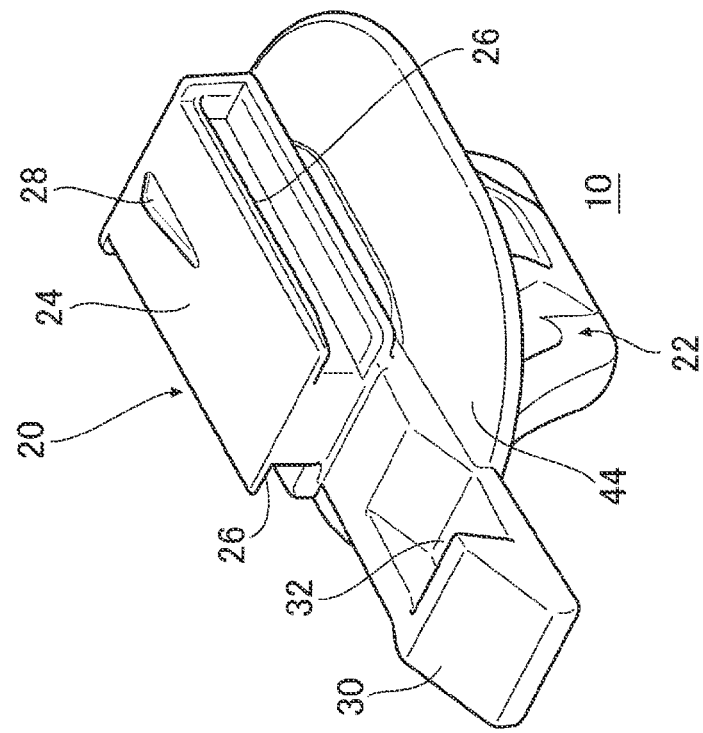
Figure 3B:
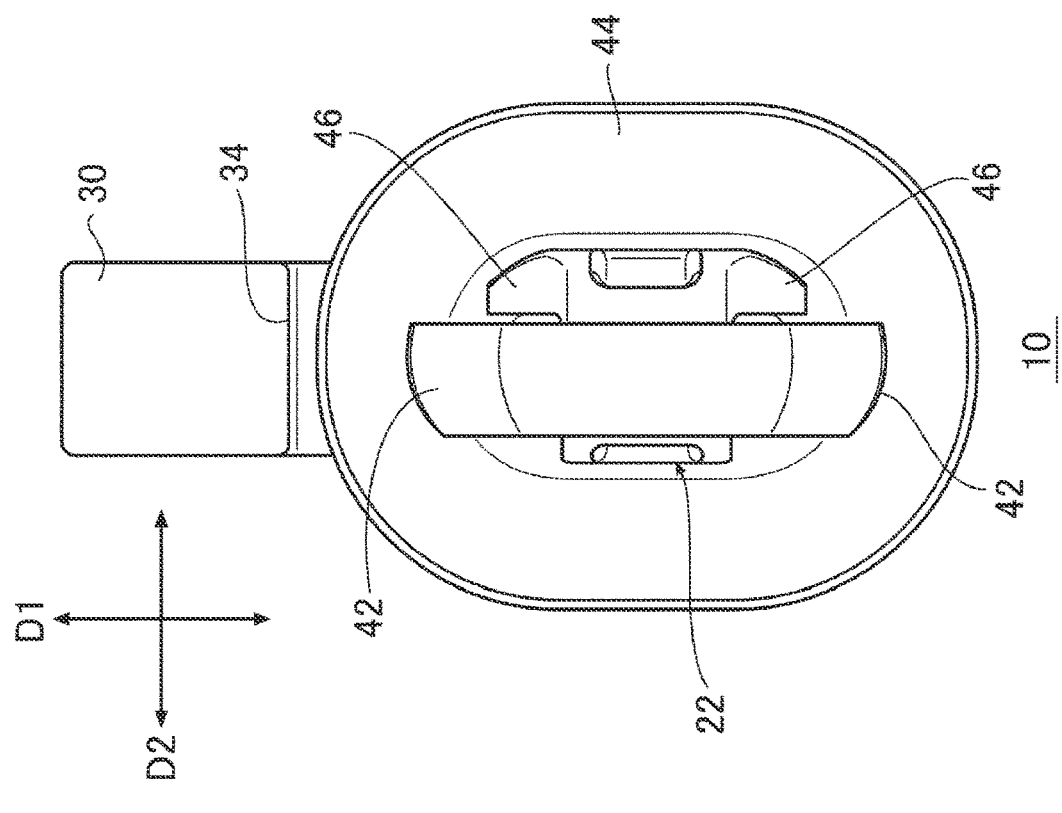
FIG. 3B is a bottom view of the fastener.
Figure 3A:
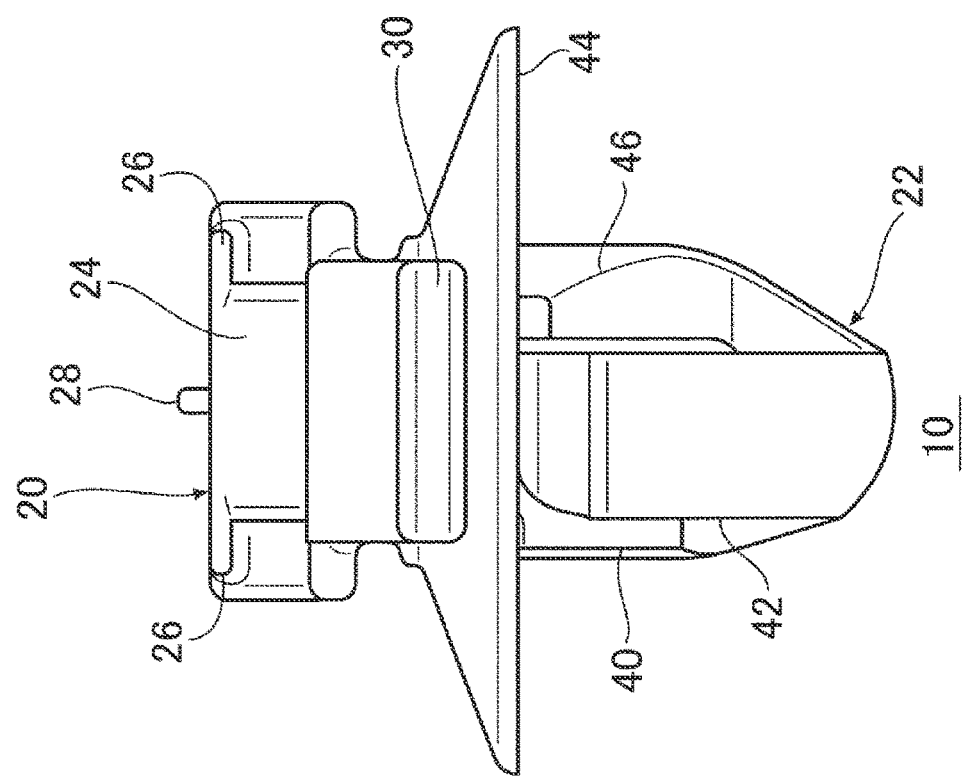
FIG. 3A is a side view of the fastener.

FIGS. 1A and 1B are perspective views of a fastener 10 according to an embodiment. FIG. 1A is a perspective view of the fastener 10 as viewed from above, and FIG. 1B is a perspective view of the fastener 10 as viewed from below. FIG. 2A is a front view of the fastener 10, and FIG. 2B is a plan view of the fastener 10. FIG. 3A is a side view of the fastener 10, and FIG. 3B is a bottom view of the fastener 10.

The fastener 10 is used to attach a component to an attachment member. For example, the fastener 10 is used to fix a connector to a vehicle body panel or an interior panel. That is, the connector exists as a component, and the vehicle body panel or the interior panel exists as the attachment member. The fastener 10 is attached to an attachment hole, but may be attached to a bolt erected on the vehicle body panel.

The connector is used to connect wires to each other, and is capable of holding terminals of a plurality of wires. The connector includes a main body portion for connecting the wire and rail grooves for coupling to the fastener 10. The connector is formed of a resin material harder than the fastener 10 in order to connect the wire of the metal material. The connector will be described in detail later.

The fastener 10 includes a coupling portion 20 and a fixing portion 22, and is formed of a resin material. The coupling portion 20 is coupled to the connector. The fixing portion 22 supports the coupling portion 20 and is fixed to the attachment hole of the attachment member. The attachment hole is a long hole for suppressing a rotation of the fastener 10 about an axis, but may be a square hole.

The fixing portion 22 includes a shaft portion 40, elastic locking portions 42, a flange portion 44, and rotation restricting portions 46. The shaft portion 40 is formed so as to hang down from a lower surface of the coupling portion 20. The elastic locking portions 42 extend so as to be folded back from a distal end of the shaft portion 40 toward the flange portion 44 side. The elastic locking portions 42 are locked to a back edge of the attachment hole.

The flange portion 44 projects radially outward from a base end of the shaft portion 40 and is formed in an umbrella shape. The flange portion 44 abuts against a surface of the attachment member and is in a state of sandwiching the attachment member with the elastic locking portions 42. Accordingly, the fixing portion 22 is fixed to the attachment member. As shown in FIG. 3B, the rotation restricting portions 46 protrude from a side surface of the shaft portion 40 in a longitudinal direction D1 and are inserted into the attachment hole. When the rotation restricting portions 46 abut against the edge of the attachment hole, it is possible to restrict the fastener 10 from rotating about the axis with respect to the attachment hole.

The coupling portion 20 includes a base portion 24, insertion portions 26, a protruding portion 28, and an elastic piece 30. The base portion 24 is formed in a substantially flat plate shape and is provided to be continuous with the fixing portion 22. The base portion 24 has a substantially rectangular parallelepiped shape and is formed in a longitudinal shape. The longitudinal direction D1 of the base portion 24 shown in FIG. 2B is along an insertion direction of the connector. A width direction D2 of the base portion 24 and the elastic piece 30 is orthogonal to the longitudinal direction D1. A direction orthogonal to the longitudinal direction D1 and the width direction D2 is referred to as an axial direction.

The insertion portions 26 extend along the insertion direction of the connector, and are formed in a wall shape so as to project laterally from the base portion 24. The insertion portions 26 function as a rail to be inserted into the rail grooves of the connector.

The protruding portion 28 is formed to protrude from a surface of the base portion 24, abuts against the connector, and acts to incline the connector toward the elastic piece 30 side. As shown in FIG. 2A, the protruding portion 28 is inclined so as to rise along the longitudinal direction. The protruding portion 28 is located on a rear end side in the insertion direction when the insertion portions 26 are inserted into the connector. Note that the number of protruding portions 28 is not limited to one, and may be plural.

The elastic piece 30 is located at a position shifted from the insertion portions 26 in the insertion direction into the connector, and extends from the base portion 24 in the insertion direction. The elastic piece 30 extends radially outward from the base portion 24 with respect to the flange portion 44. A root side of the elastic piece 30 is referred to as a base end portion 30a. The elastic piece 30 abuts against the connector to urge the connector in a direction away from the attachment member, thereby suppressing rattle of the connector. By providing the insertion portions 26 and the elastic piece 30 so as to be shifted from each other, it is possible to suppress an increase in the height of the coupling portion 20 in the axial direction and to stabilize an attachment state by bringing the connector closer to the attachment member. In order to insert the insertion portions 26 into the rail grooves of the connector, the elastic piece 30 is provided at a position where insertion of the insertion portions 26 is not interfered, and is provided at a position lower than the insertion portions 26 in the axial direction.

The elastic piece 30 includes a locking portion 32 that is locked to the connector to restrict the insertion portions 26 from coming out of the rail grooves, and a step portion 34 that is positioned on a back surface of the elastic piece 30 and that is formed so as to protrude from a back surface of the base end portion 30a of the elastic piece 30 toward the attachment member side. The back surface of the base end portion 30a is a lower surface of the elastic piece 30 and is a surface facing the attachment member 14.

The locking portion 32 is formed on a surface of the elastic piece 30 so as to be recessed from the surface of the base end portion 30a of the elastic piece 30. The surface of the elastic piece 30 faces the connector. The locking portion 32 includes a locking surface 32a that is locked to a claw portion formed on the connector. When the locking portion 32 is formed in a convex shape on the surface of the elastic piece 30, the locking portion 32 may interfere with a claw portion 12b to increase insertion resistance at the time of insertion of the connector, but the locking portion 32 is formed in a concave shape, so that it is possible to sufficiently secure a hooking margin of the locking portion 32 while facilitating the insertion of the connector. By urging the connector at a position close to the attachment member, the rattle of the connector can be effectively suppressed. Further, by recessing the locking portion 32 from the base end portion 30a of the elastic piece 30, the rigidity of the base end portion 30a side can be ensured, and an urging force of the extended elastic piece 30 can be ensured.

The locking portion 32 is located in the middle of the elastic piece 30 in the longitudinal direction and is formed so as to be partially cut out in the width direction D2 of the elastic piece 30 as shown in FIG. 2B. The locking portion 32 is formed by cutting out half or more of the elastic piece 30 in the width direction D2, and a pillar portion 36 of the elastic piece 30 remains. The recessed locking portion 32 and the protruding pillar portion 36 are adjacent to each other in the width direction D2. Accordingly, it is possible to suppress a decrease in rigidity due to the formation of the locking portion 32.

The step portion 34 is formed on the back surface of the elastic piece 30 at a position overlapping with the locking portion 32 in a thickness direction (axial direction), and protrudes downward. By forming the step portion 34, while the locking portion 32 is provided at a position at which the locking portion 32 does not interfere with the insertion portions 26 in the axial direction, it is possible to form the locking portion 32 deeply, and to secure the hooking margin with respect to the connector. In addition, even if the locking portion 32 is provided, it is possible to suppress a decrease in the rigidity of the distal end side of the elastic piece 30. In addition, by providing the step portion 34, a gap between the base end portion 30a of the elastic piece 30 and the flange portion 44 can be secured, and the base end portion 30a of the elastic piece 30 can be suppressed from interfering with the deformation of the flange portion 44.

Figure 4A:
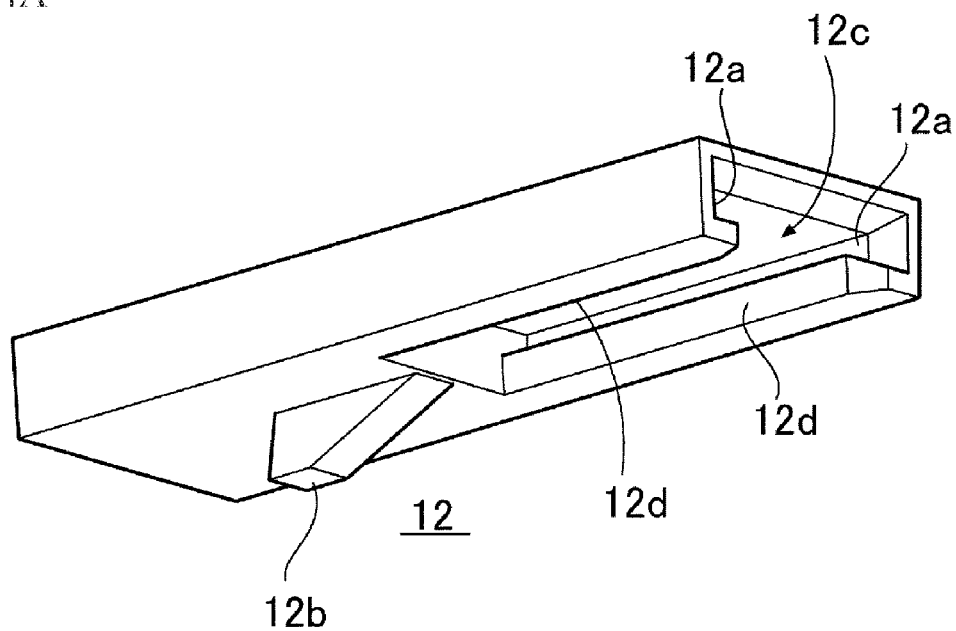
FIG. 4A is a perspective view of a connector.
Figure 4B:
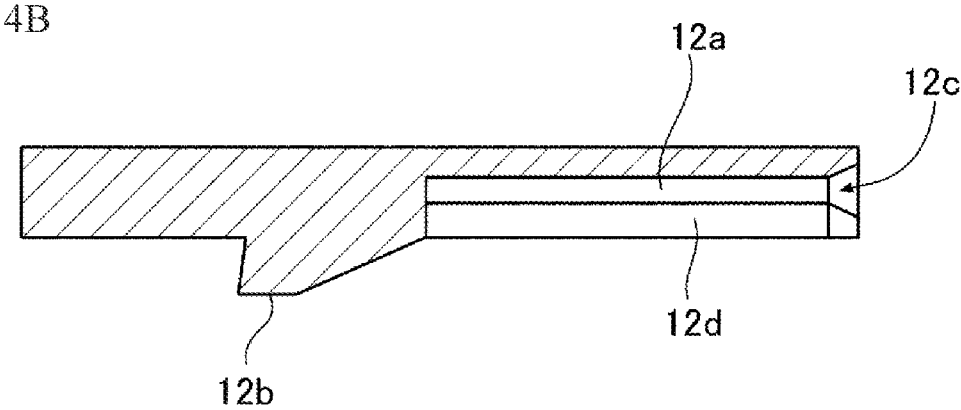
FIG. 4B is a sectional view along a longitudinal direction of the connector.

FIG. 4A is a perspective view of the connector IL, and FIG. 4B is a sectional view along the longitudinal direction of the connector 12. In the connector 12 shown in the embodiment, a main body portion connecting the wires is omitted, but the main body portion is actually provided on an upper portion of the connector 12 shown in FIG. 4A.

The connector 12 includes a pair of rail grooves 12a, the claw portion 12b, an insertion opening 12c, and a pair of projecting portions 12d. The pair of rail grooves 12a are formed on both sides of the connector 12, and the insertion portions 26 of the fastener 10 are inserted thereinto. The pair of projecting portions 12d are disposed on both sides of the connector 12 so as to face each other, and are formed so as to project inward.

The insertion opening 12c is opened so as to receive the insertion portions 26 of the fastener 10. The claw portion 12b is formed to protrude from a back surface of the connector 12, and is locked to the elastic piece 30 of the fastener 10. The claw portion 12b is located at a position shifted from the rail grooves 12a in the longitudinal direction.

Figure 5A:
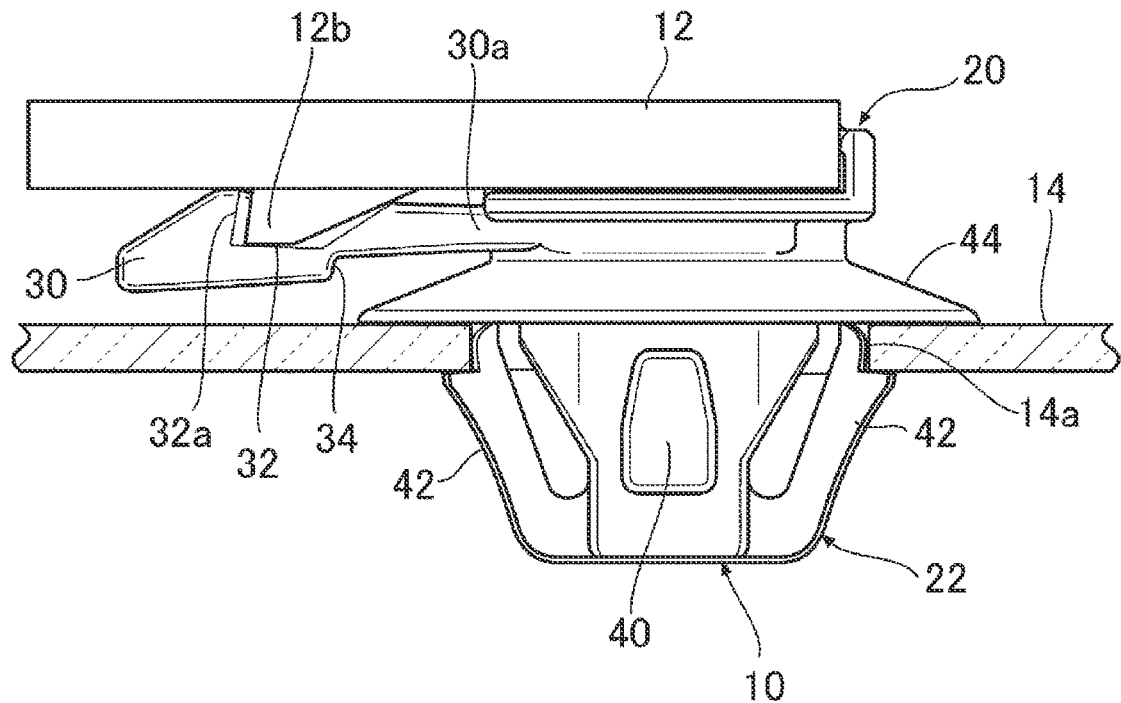
FIGS. 5A and 5B are views illustrating the fastener in a state where a coupling portion and the connector are coupled to each other.
Figure 5B:
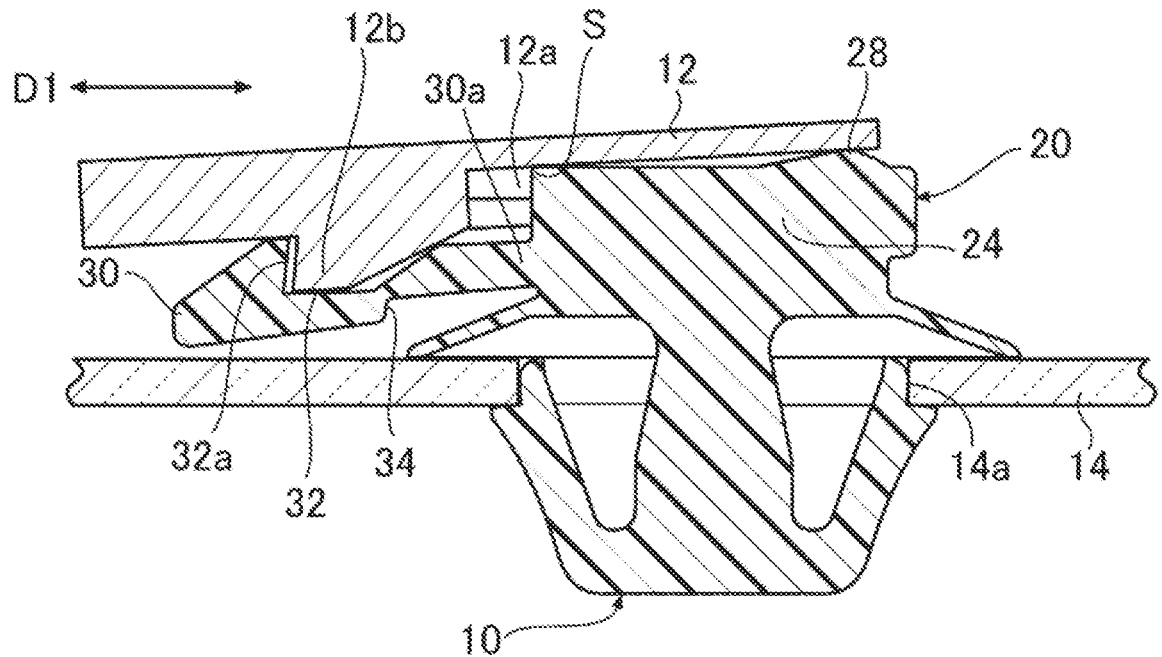

FIGS. 5A and 5B are views illustrating the fastener 10 in a state where the coupling portion 20 and the connector 12 are coupled to each other. FIG. 5A is a front view of the fastener 10, and FIG. 5B is a sectional view of the fastener 10. Note that, in FIG. 5B, in order to facilitate understanding of the action of the fastener 10, the connector 12 is shown in a state of being inclined more greatly than the actual coupled state shown in FIG. 5A.

In the coupled state, the insertion portions 26 are inserted into the rail grooves 12a, and the locking portion 32 is locked to the claw portion 12b. Since the insertion portions 26 are inserted into the rail grooves 12a, the movement of the connector 12 away from the attachment member 14 is restricted. In addition, since the locking portion 32 is locked to the claw portion 12b, the movement of the connector 12 to be disengaged from the coupling portion 20 is restricted. The width of the rail grooves 12a in the axial direction is formed to be larger than the width of the insertion portions 26 in the axial direction in order to facilitate insertion of the insertion portion 26s. That is, the rail grooves 12a and the insertion portions 26 have a gap in the axial direction in a coupled state.

The protruding portion 28 protrudes so as to be larger than the axial gap between the rail grooves 12a and the insertion portions 26. In a state where the locking portion 32 is locked to the claw portion 12b, an apex of the protruding portion 28 abuts against the connector 12. As shown in FIG. 5B, the protruding portion 28 abuts against the connector 12 at a position shifted from the elastic piece 30 in the longitudinal direction D1 (insertion direction). In a state where the elastic piece 30 is locked to the connector 12, the protruding portion 28 abuts so as to lift the connector 12, whereby the connector 12 acts so as to swing about an upper edge of the base portion 24 as a fulcrum S, and a portion of the connector 12 facing the elastic piece 30 is pressed against the elastic piece 30. The elastic piece 30 abuts against the connector 12 to be bent downward so as to approach the attachment member 14, and elastically contacts the connector 12 by a reaction force thereof. As a result, the connector 12 can be suppressed from swinging along the longitudinal direction, and the wires can be suppressed from coming off. Although the bottom surface of the locking portion 32 abuts against the distal end of the claw portion 12b, another portion of the elastic piece 30 may abut against the connector 12. That is, a portion of the connector 12 facing the elastic piece 30, which is a portion that abuts against the elastic piece 30, is not limited to the claw portion 12b.

The present invention is not limited to the embodiments described above, and various modifications such as design changes can be added to the embodiments based on the knowledge of those skilled in the art, and embodiments to which such modifications are added can also be included in the scope of the present invention.

In the embodiment, a mode in which the fixing portion 22 is fixed to the attachment hole 14a is shown, but the present invention is not limited to this mode. For example, the fixing portion 22 may be fixed to a bolt protruding from the attachment member 14.

INDUSTRIAL APPLICABILITY

The present invention relates to the fastener for attaching a component to an attachment member.

REFERENCE SIGNS LIST 10 fastener, 12 connector, 12a rail groove, 12b claw portion, 12c insertion opening, 14 attachment member, 14a attachment hole, 20 coupling portion, 22 fixing portion, 24 base portion, 26 insertion portion, 28 protruding portion, 30 elastic piece, 30a base end portion, 32 locking portion. 32a locking surface, 34 step portion, 36 pillar portion, 40 shaft portion, 42 elastic locking portion, 44 flange portion, 46 rotation restricting portion

The invention claimed is:

1. A fastener for attaching a component having a rail groove to an attachment member, the fastener comprising:
a coupling portion that is configured to be coupled to the component; and
a fixing portion that supports the coupling portion and that is configured to be fixed to the attachment member,
wherein the coupling portion includes an insertion portion to be inserted into the rail groove, and an elastic piece located at a position shifted from the insertion portion in an insertion direction,
wherein the elastic piece includes a locking portion that is configured to be locked to the component to restrict the insertion portion from coming out of the rail groove, the elastic piece configured to abut against and urge the component in a bent state, and
wherein a base end portion of the elastic piece is located between the fixing portion and the insertion portion in an axial direction orthogonal to the insertion direction and a width direction of the elastic piece.

2. The fastener according to claim 1,
wherein the locking portion is formed on a surface of the elastic piece facing the component so as to be recessed from a surface of a base end portion of the elastic piece, and is configured to be locked to a claw portion formed on the component.

3. The fastener according to claim 1,
wherein the elastic piece includes a step portion formed on a back surface of the elastic piece so as to protrude from a back surface of a base end portion of the elastic piece toward a side of the attachment member, and
wherein the step portion is formed at a position overlapping with the locking portion in a thickness direction.

4. The fastener according to claim 1,
wherein the coupling portion includes a protruding portion that is configured to abut against the component at a position shifted from the elastic piece in the insertion direction, and
wherein a portion of the component facing the elastic piece is configured to be pressed against the elastic piece by the protruding portion abutting against the component in a state where the elastic piece abuts against the component.

* * * * *